(12) United States Patent
Lentz

(10) Patent No.: US 11,096,474 B2
(45) Date of Patent: Aug. 24, 2021

(54) HAND ATTACHABLE ANIMAL WASHING APPARATUS

(71) Applicant: Daniel Jacob Lentz, Campbell, CA (US)

(72) Inventor: Daniel Jacob Lentz, Campbell, CA (US)

(*) Notice: Subject to any disclaimer, the term of this patent is extended or adjusted under 35 U.S.C. 154(b) by 62 days.

(21) Appl. No.: 16/583,624

(22) Filed: Sep. 26, 2019

(65) Prior Publication Data

US 2020/0015581 A1 Jan. 16, 2020

Related U.S. Application Data

(63) Continuation of application No. 15/641,018, filed on Jul. 3, 2017, now Pat. No. 10,531,728.

(60) Provisional application No. 62/396,123, filed on Sep. 17, 2016.

(51) Int. Cl.
| | | |
|---|---|---|
| *A46B 9/00* | (2006.01) | |
| *A46B 11/06* | (2006.01) | |
| *A46B 1/00* | (2006.01) | |
| *A46B 5/00* | (2006.01) | |
| *A46B 11/00* | (2006.01) | |
| *A01K 13/00* | (2006.01) | |
| *A47K 3/28* | (2006.01) | |
| *A47K 3/00* | (2006.01) | |
| *A46B 5/04* | (2006.01) | |

(52) U.S. Cl.
CPC .......... *A46B 11/063* (2013.01); *A01K 13/001* (2013.01); *A46B 1/00* (2013.01); *A46B 5/0029* (2013.01); *A46B 5/04* (2013.01); *A46B 9/005* (2013.01); *A46B 11/0006* (2013.01); *A46B 11/0072* (2013.01); *A46B 2200/1093* (2013.01); *A47K 3/001* (2013.01); *A47K 3/281* (2013.01)

(58) Field of Classification Search
CPC ......... A46B 11/063; A46B 1/00; A46B 11/06; A46B 11/0006; A46B 5/029; A46B 5/04; A46B 9/005; A46B 11/0072; A46B 2200/1093; A46B 2200/10; A46B 5/0025; A46B 5/002; A46B 5/0033; A46B 2200/20; A01K 13/001; A47K 3/001; A47K 3/281
USPC .............. 401/7, 8, 261, 263, 265, 266
See application file for complete search history.

(56) References Cited

U.S. PATENT DOCUMENTS

| | | |
|---|---|---|
| 836,181 A | 11/1906 | Gray |
| 1,530,327 A | 11/1923 | Redlick |
| 1,534,208 A | 11/1923 | Gibson |
| 1,533,732 A | 4/1925 | Frost |

(Continued)

*Primary Examiner* — David J Walczak
(74) *Attorney, Agent, or Firm* — Williams Intellectual Property; Benjamin F. Williams

(57) ABSTRACT

A hand attachable animal washing apparatus, attachable upon the hand of a user, enables singlehanded control of waterflow and application of water into the coat of an animal. Control of waterflow though a molded body member is enabled by operation of a compressible portion disposed to control a valve assembly disposed interiorly within the molded body member. A proximal arced edge is disposed projected rearwardly from the molded body member and curved downward to direct waterflow away from a user operating the device, particularly when the device is elevated above a user, as when washing a large animal such as a horse, for example. A user may thereby control and apply water to an animal with one hand while securing and comforting the animal with the other hand.

11 Claims, 9 Drawing Sheets

(56) References Cited

U.S. PATENT DOCUMENTS

| | | | | |
|---|---|---|---|---|
| 1,554,789 | A | * | 9/1925 | Crary ................... C11D 17/02 |
| | | | | 401/28 |
| 2,562,418 | A | | 4/1950 | Enrico |
| 2,663,890 | A | | 7/1950 | Sullins |
| 3,214,783 | A | * | 11/1965 | Perry ................... A47K 5/122 |
| | | | | 401/28 |
| 3,431,055 | A | * | 3/1969 | Lowery ................ A46B 15/00 |
| | | | | 401/28 |
| 4,037,790 | A | | 7/1977 | Resiser et al. |
| 5,048,759 | A | | 9/1991 | Mazziotta |
| 5,722,349 | A | | 3/1998 | Wolgamuth |
| 6,834,619 | B1 | | 12/2004 | Rampersad |
| 8,262,307 | B1 | * | 9/2012 | Cross ................ A46B 11/0041 |
| | | | | 401/280 |
| 8,794,189 | B1 | | 8/2014 | Dahlquist et al. |
| 9,167,948 | B2 | | 10/2015 | Tucker |
| 2013/0305998 | A1 | | 11/2013 | Brown et al. |
| 2016/0073611 | A1 | | 3/2016 | Hightower |

\* cited by examiner

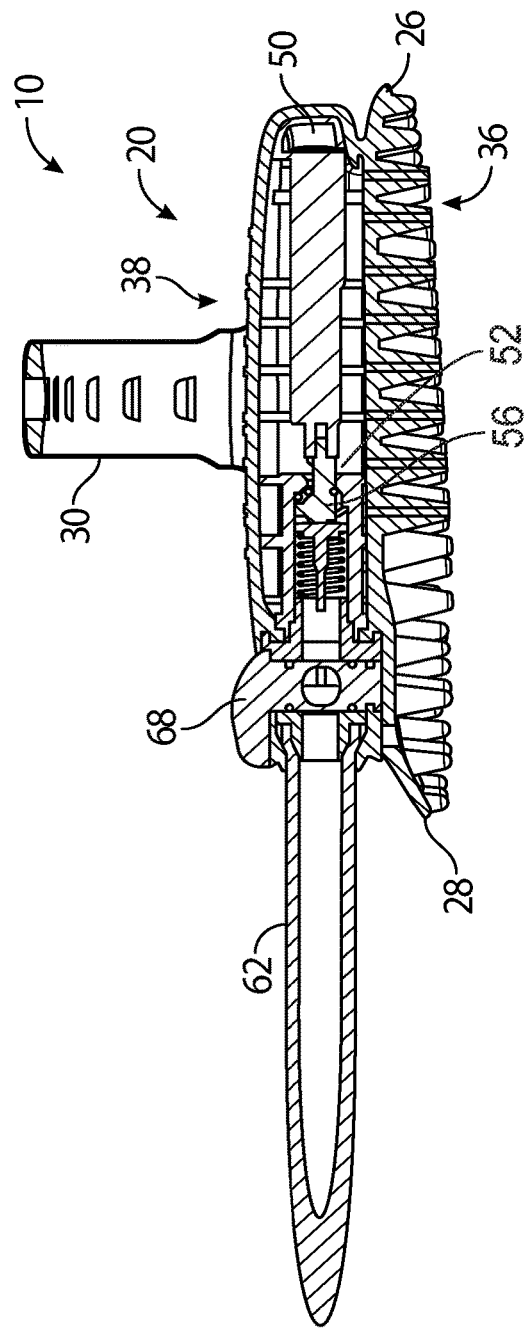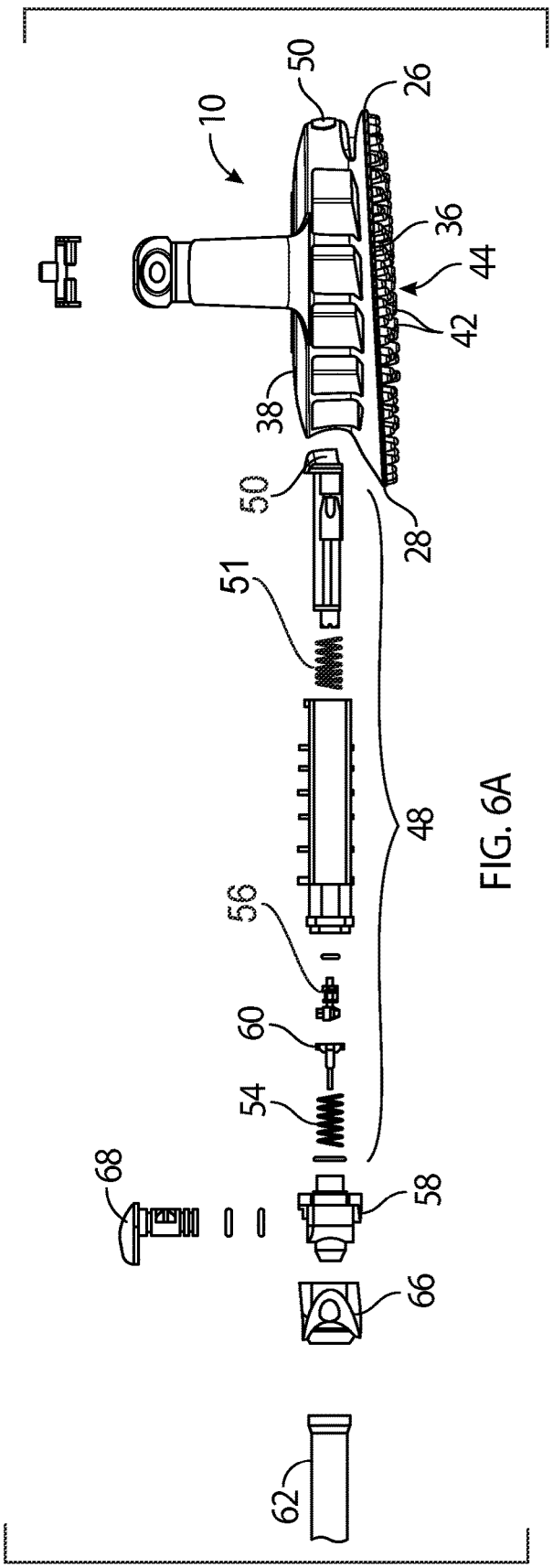

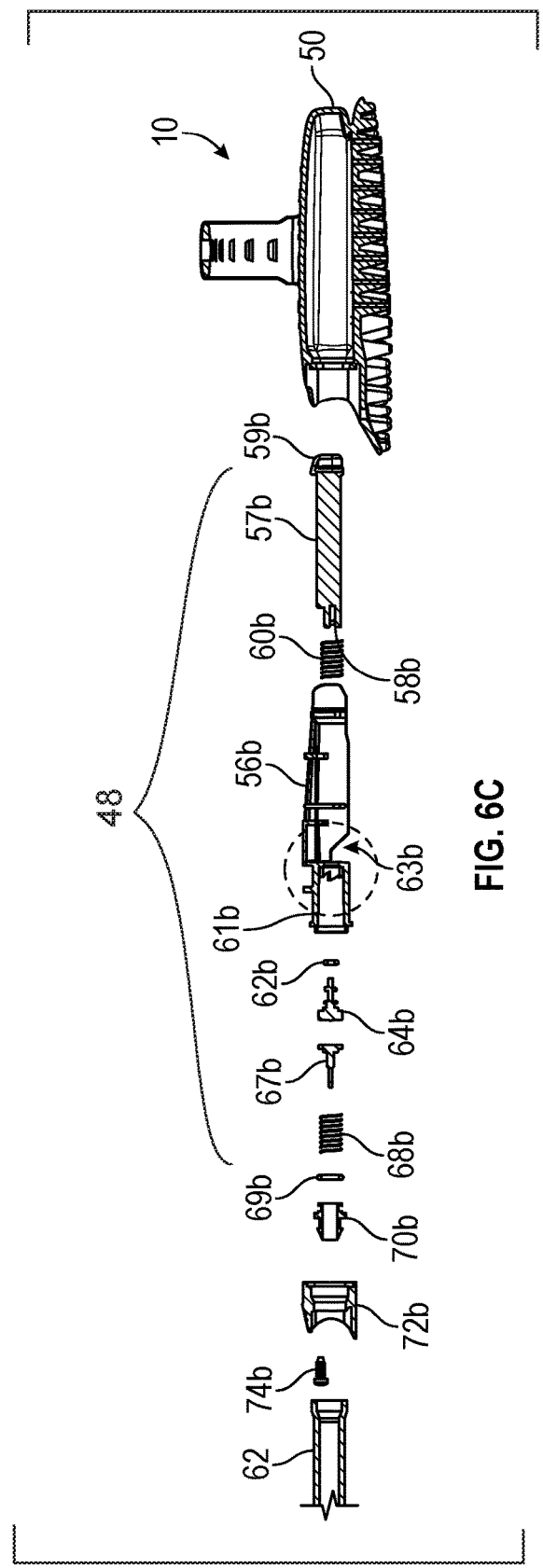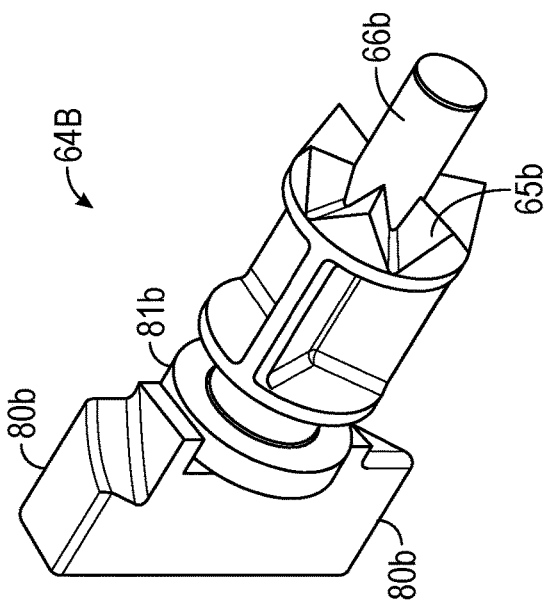

HAND ATTACHABLE ANIMAL WASHING APPARATUS

CROSS-REFERENCE TO RELATED APPLICATIONS

This continuation-in-part application claims the benefit of nonprovisional application Ser. No. 15/641,018 filed on Jul. 3, 2017, which claims the benefit of provisional application No. 62/396,123 filed on Sep. 13, 2016 Sep. 13, 2016, and issued as U.S. Pat. No. 10,531,728 on Jan. 14, 2020.

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION

To all Whom it May Concern

Be it known that I, Daniel Lentz, a citizen of the United States, have invented new and useful improvements in a hand attachable animal washing apparatus as described in this specification and that this continuing application claims the benefit of nonprovisional application Ser. No. 15/641,018 filed on Jul. 3, 2017, which in turn claims the benefit of provisional application No. 62/396,123 filed on Sep. 17, 2016.

BACKGROUND OF THE INVENTION

Washing animals can be troublesome and time consuming. Animals often shy away from water ejected from a hosepipe, which is sometimes noisy, haphazard, and unpredictable. Moreover, use of a hose to wash an animal, which is typical in the art, frequently applies more water than is necessary, ejects water somewhat uncontrollably, and often results in the user getting wet as well. This renders washing an animal with a hose an unpleasant experience for all involved.

What is needed is a hand attachable animal washing apparatus that enables singlehanded control of water flow through a plurality of openings to direct application of controlled waterflow to an animal while maintaining the user's other hand unencumbered to comfort the animal in question, to secure said animal in place, or otherwise administer additional accouterments desirably wielded during washing.

The present hand attachable animal washing apparatus therefore prevents the user from getting wet, enables more controlled application of water to the animal, and lessens discontent of the animal by operating less visibly and more quietly than a hose, while enabling the user to secure, coax, and comfort the animal with said user's free hand.

FIELD OF THE INVENTION

The present invention relates to a hand attachable animal washing apparatus devised to secure to the hand of a user and enable singlehanded control of waterflow therethrough. The present hand attachable animal washing apparatus further enables direct application of water into the fur of an animal without effecting an uncontrolled spray of water. The present hand attachable animal washing apparatus, therefore, enables controlled release of water for direct application to an animal for washing, while allowing a user to maintain one hand free for interaction with the animal, or for use wielding additional accouterments desirable during washing.

The present hand attachable animal washing apparatus, therefore, includes a molded body member, formed of a polymer which is pliable and yielding to the touch. The molded body member includes an obverse surface having a plurality of outlets and a plurality of protuberances projected perpendicularly therefrom. Each of the plurality of outlets has each of a plurality of openings disposed apically thereatop. Water is enabled passage through the molded body member for controlled emission through each of the plurality of openings by manual action controlling a valve assembly disposed interior to the molded body member. The valve assembly is controllable by manual depression of a compressible portion, disposed anteriorly upon the molded body member at a position appropriate to proximally underlie a user's forefinger and middle finger of the hand to which the present device is attached. A user may, therefore, actuate the device and alternately enable and disable controlled emission of water by action of depressing the compressible portion with said user's fingers of the same hand to which the device is attached. Thus a user is enabled singlehanded control of water for direct and controlled application directly into the animal's coat. Moreover, the plurality of protuberances and plurality of outlets are devised to penetrate into the animal's fur and contact the animal's epidermis, whereby the animal is brushed and stroked during the act of washing, which may comfort the animal even while water and soap is being applied into the animal's coat.

SUMMARY OF THE INVENTION

The present hand attachable animal washing apparatus, described subsequently in greater detail, has been devised to enable control of outflow of water singlehandedly while washing an animal, such as a dog or horse, for example. The present hand attachable animal washing apparatus enables use of one hand when applying water whereby the other hand may be used to secure or comfort the animal being washed. The animal is therefore more receptive to washing than is typically the case when a hose, sponge, and soap are more haphazardly applied absent the present invention.

The present hand attachable animal washing apparatus includes a molded body member attachable overtop the palm of a hand of a user. In the example embodiment set forth herein, the molded body member is generally ovoid and formed, or otherwise molded, of an impermeable polymer, such as, for example, silicone. The molded body member is therefore pliable and flexible. The molded body member includes an obverse surface and a reverse surface. The reverse surface is generally smooth and devised for comfortable fit overtop a user's palm, as will be described subsequently. The obverse surface includes a plurality of openings disposed to emit water when the molded body member is connected to a water outlet and a valve assembly, disposed interior to the molded body member, is toggled between a closed situation and an open situation, as will be described subsequently.

In the example embodiment herein described, each of the plurality of openings is disposed apically atop each of a plurality of outlets. Each of the plurality of outlets is elongate, conical, and perpendicularly disposed atop the obverse surface. The plurality of outlets is disposed in a central cluster in open communication with the valve assembly, whereby flow of water through the molded body member is effective through the central cluster. Surrounding the central cluster is a plurality of protuberances, each of which is plurality of protuberances is perpendicularly disposed atop the obverse surface, there devised to penetrate into the fur of an animal, stimulate the epidermis, and brush the animal's coat during washing.

The molded body member is delimited by a distal arced edge, a proximal arced edge, a first side apex, and a second side apex. The molded body member may taper in thickness towards each of the first side apex and the second side apex. The proximal arced edge may extend the obverse surface in a downward direction relative to a user wearing the device, whereby water flow produced during use is directed away from a user, particularly when the user operates the device in an elevated capacity, such as when washing a horse or other large animal requiring the user reach upwardly. A strap member is disposed upon the first side apex and devised to releasably secure to a connection portion disposed upon the second side apex. The strap member and connection portion may resemble a watch strap, for example, and releasable securement may be effective by action of a buckle member disposed to interconnect said strap member with the connection portion.

The molded body member is therefore positionable upon the palm of a user's hand and then securable by engagement of each of the strap member and connection portion connectable around the dorsal of said user's hand. A connecting line is disposed connected to a inlet port disposed in the molded body member in a position overtop the proximal arced edge. The proximal arced edge is disposed to extend underneath the connecting line to divert waterflow downwardly and away from a user operating the device. The connecting line includes a distal attachment portion devised for attachment to a water outlet, such as a tap, wherein water is introducible into the molded body member and therein controllable by action of the valve assembly.

The valve assembly includes a compressible portion disposed against the action of a first spring member. The compressible portion is disposed anteriorly upon the molded body portion proximally located in a position appropriate to underlie the forefinger and middle finger of a user's hand when said user is wearing the device. The compressible portion toggles outflow of water from the plurality of openings by moving a switch member alternately between each of a first position and a second position whereby throughflow of water is enabled and alternately disabled.

In one embodiment, the valve assembly includes a manually operable switch member positionable between at least a first position and a second position. The switch member is disposed to regulate flow between the first position (admitting a minimum waterflow) and a second position (admitting a maximum waterflow). In the example embodiment herein disclosed, the manually operable switch member is disposed upon the inlet port, rearwardly upon the molded body member. A user wearing the device, therefore, is readily enabled expedient regulation of water flow with said user's free hand.

In another embodiment the manually operable switch member is omitted, and action of the valve by compression of the compressible portion is the singular control for waterflow through the apparatus. In this other embodiment, a valve gear operates to rotate between at least three valve states wherein waterflow through the valve assembly is regulated between no flow, low flow, and a high flow rate.

A user is thus enabled expedient control of throughflow of water when washing an animal and may expediently toggle the present device to wet the animal and then rinse subsequent application of soap, for example. The polymeric molded body member is pliable and yielding, and therefore enables direct application of water into the animal's coat, and further acts as an applicator brushing the water and any applied soap into the animal's coat. The user may also use said user's other hand for holding the animal, comforting the animal, or for other actions useful in expediting washing an animal due to singlehanded operation of the present device controlling application of water for washing and rinsing said animal, as desired.

Thus has been broadly outlined the more important features of the present hand attachable animal washing apparatus so that the detailed description thereof that follows may be better understood and in order that the present contribution to the art may be better appreciated.

For better understanding of the hand attachable animal washing apparatus, its operating advantages and specific objects attained by its uses, refer to the accompanying drawings and description.

BRIEF DESCRIPTION OF THE DRAWINGS

Figures

FIG. 5 is a longitudinal cross-section view of an example embodiment.

FIG. 6A is an exploded view of an example embodiment detailing a particular valve assembly.

FIG. 6C is an exploded side view of the example embodiment of the particular valve assembly illustrated in FIG. 6B.

FIG. 6D is a detail view of a gear sleeve illustrated in FIGS. 6B and 6C.

FIG. 6E is a detail view of a valve gear illustrated in FIGS. 6B and 6C.

Figure 1:
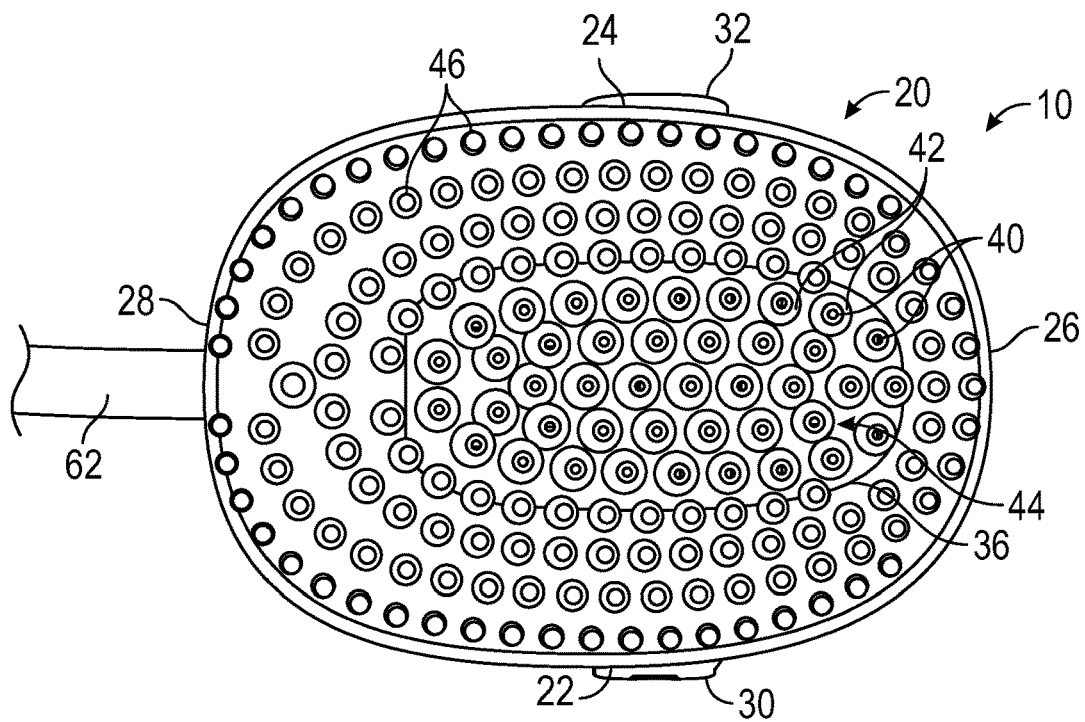
FIG. 1 is an elevation view of an obverse surface of an example embodiment.
Figure 2:
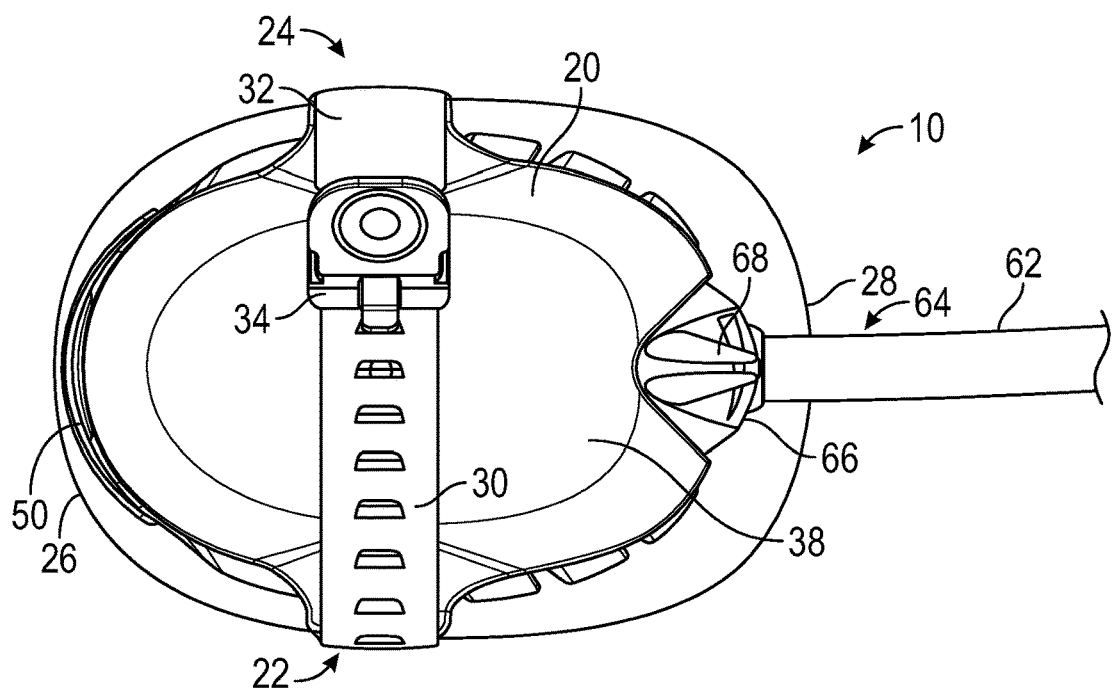
FIG. 2 is an elevation view of a reverse surface of an example embodiment.
Figure 3:
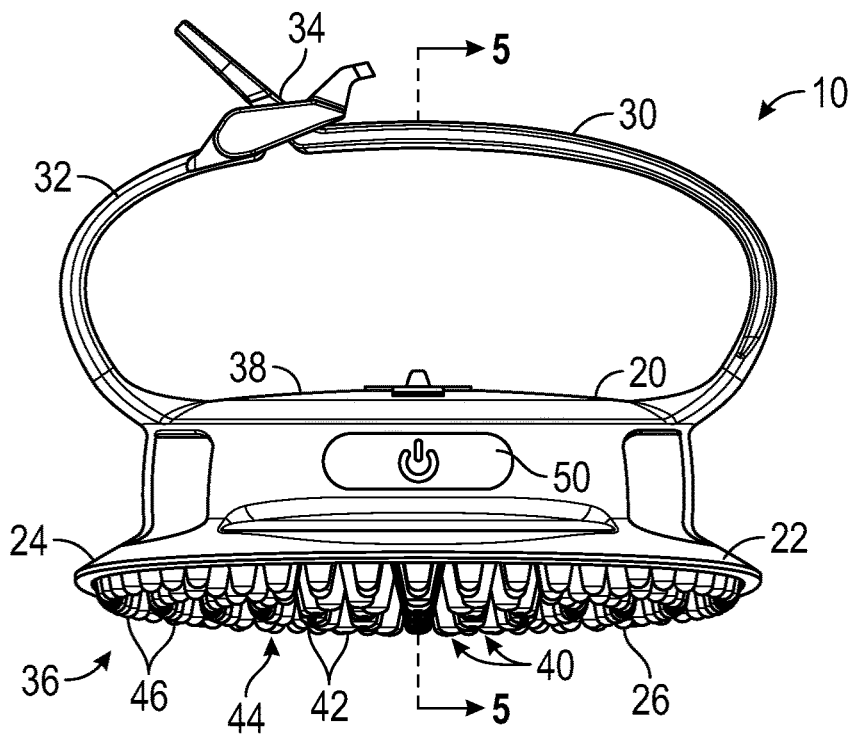
FIG. 3 is a front elevation view of an example embodiment.
Figure 4:
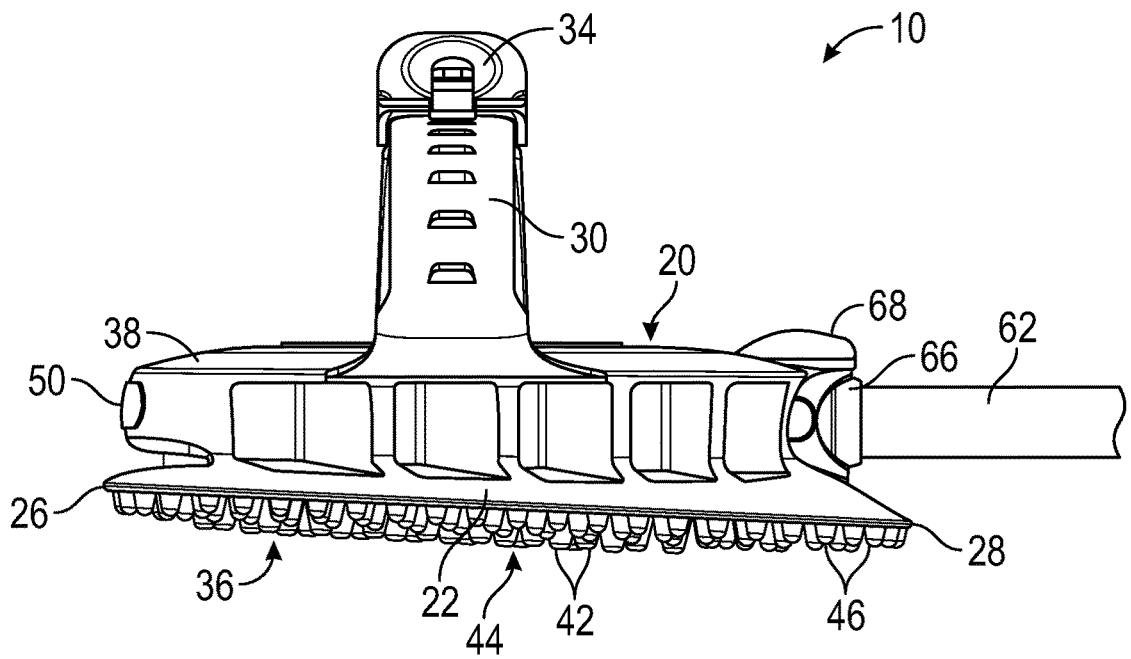
FIG. 4 is a side elevation view of an example embodiment.

LIST OF PARTS 10 hand attachable animal washing apparatus
20 molded body member
22 first side apex
24 second side apex
26 distal arced edge
28 proximal arced edge
30 strap member
32 connection portion
34 buckle member
36 obverse surface 38 reverse surface
40 plurality of openings
42 plurality of outlets
44 central cluster
46 plurality of protuberances
48 valve assembly
50 compressible portion
52 valve outlet
54 spring member
56 switch member
58 regulator
60 stop member
62 connecting line
64 proximal inlet
66 connect housing
68 manually operable switch
56b switch housing
57b striker pin
58b tail end
59b head end
60b first spring member
61b gear sleeve
62b first O-ring
63b outlet
64b valve gear
65b triangulated surface
66b cylindrical tip
67b stop member
68b second spring member
69b second O-ring
70b inlet
72b connect housing
74b fasteners
78b second pair of channels
79b third pair of channels
80b diametric wings
81b circumferential seat

DETAILED DESCRIPTION OF THE DRAWINGS

With reference now to the drawings, and in particular FIGS. 1 through 12 thereof, example of the instant hand attachable animal washing apparatus employing the principles and concepts of the present hand attachable animal washing apparatus and generally designated by the reference number 10 will be described.

The present hand attachable animal washing apparatus 10 has been devised to enable controlled emission of water through a plurality of openings 40 disposed in an obverse surface 36 of a molded body member 20 effected by single-handed operation of a user wearing the device. The hand attachable animal washing apparatus 10 is attachable overlying the palm of a user whereby the molded body member 20 is disposed against the palm of the user. The plurality of openings 40 disposed in the obverse surface 36 of the molded body member 20 enables controlled outflow of water when an interior valve assembly 48 is activated between a closed situation and an open situation, whereby throughflow of water from a connecting line 62 is directable out each of the plurality of openings 40 for controlled application directly to an animal contacted with the obverse surface 36. Singlehanded operation of the valve assembly 48 enables a user to secure the animal in appropriate position with their other hand during the act of washing.

Discussing now the drawings of an example embodiment of the present device depicted herein and referring generally to FIGS. 1 through 4, the present hand attachable animal washing apparatus 10 includes a generally ovoid molded body member 20 attachable overlying the palm of a user's hand. The molded body member 20 is contemplated to be polymeric and flexible, and includes a first side apex 22, a second side apex 24, a distal arced edge 26, and a proximal arced edge 28. A strap member 30 is disposed extended from the first side apex 22, said strap member 30 attachable to a connection portion 32 disposed at the second side apex 24. The strap member 30 and connection portion 32 may resemble a wrist watch strap, for example, and include a buckle member 34 disposed to releasably secure the strap member 30 and connection portion 32 together. Additional means of releasable securement of said strap member 30 and connection portion 32 are contemplated as part of this disclosure.

The molded body member 20 includes an obverse surface 36 and a reverse surface 38. The reverse surface 38 is disposed to overlie the palm of a user's hand to which the device is attached by action of the strap member 30 securing to the connection portion 32 around the dorsal side of the user's hand.

As best shown in FIG. 1, the plurality of openings 40 is disposed endwise upon each of a plurality of outlets 42. Each of the plurality of outlets 42 may be elongate, conical, and disposed in a central cluster 44, as depicted herein, or otherwise disposed upon the obverse surface 36. In the example embodiment shown, a plurality of protuberances 46 is disposed surrounding the central cluster 44, each of said plurality of protuberances 46 disposed to contact through the fur of the animal to which the device is applied when washing. The plurality of protuberances 46, and each of the plurality of outlets 42, act to effect brushing of the animal's coat as well as to apply water into the fur and against the epidermis.

Referring now to FIGS. 5 and 6A, a valve assembly 48 is disposed interiorly within the molded body member 20 in open communication with each of the plurality of openings 40. The valve assembly 48 includes a compressible portion 50 devised to alternately open and close a valve outlet 52 when depressed. The compressible portion 50 is situated in a position interior to the molded body member 20 proximally overlying the center of the user's palm when wearing the device on a hand, whereby said user may enable depression of the compressible portion 50 with said user's fingers. The compressible portion 50 is disposed against the action of spring members 51 and 54, said spring members 51 and 54 disposed to return the compressible portion 50 to an uncompressed position once released. When compressed, the compressible portion 50 enables reorientation of a switch member 56 between a first position and a second position whereby the valve outlet 52 is alternately exposed and concealed.

When moved to the first position, the switch member 56 is forced in a first direction against the action of the spring member 54, whereby the switch member 56 tensions said spring member 54. When compressed, the spring member 54 enables rotation of the switch member 56, whereby the valve outlet 52 is exposed and the valve assembly 48 is rendered in the open situation. Spring member 54 is prevented from rebounding by action of stop member 60 against which the switch member 56 is oriented, whereby the valve outlet 52 is maintained open and the valve assembly 48 is rendered in the open situation. Ensuing depression of the compressible portion 50 reorients the switch member 56 by effectuating movement to return the switch member 56 to the second position, whereby the switch member 56 is disengaged with the stop member and wherein the valve outlet 52 is closed and the valve assembly 48 is rendered in the closed situation. Alternate depressions of the compressible portion 50 therefore toggle the valve assembly 48 between the open situation and closed situation.

Still referring to FIGS. 5 and 6A, the connecting line 62 is disposed attached at a proximal inlet 64 medially disposed above the proximal arced edge 28 of the molded body member 20 and may be secured thereat by means of a connect housing 66. The connecting line 62 may be detachable from the connect housing 66. The connecting line 62 is distally attachable to a water outlet, such as an existing hose pipe or tap, for example. Opening said tap, or hose pipe, enables flow of water into the connecting line 62 and into the molded body member 20. Water is prevented from exiting through the plurality of openings 40 disposed upon the obverse surface 36 until the valve assembly 48 is disposed in the open situation.

Compression of the compressible portion 50 therefore enables selective opening and closing of the valve assembly 48 between the open and closed situations whereby outflow of water is controllable singlehandedly while washing an animal. A user may, therefore, use their free hand for holding the animal in position, for coaxing or comforting the animal, or otherwise to participate in the act of washing, as desired.

A manually operable switch member 68 is included, disposed upon the proximal inlet 64 above the proximal arced edge 28 in operational communication with a regulator 58 disposed in open communication between proximal inlet 64 and the valve assembly 48. The manually operable switch member 68 is manually operable by use of the user's other hand to control and regulate the rate of water flow through the valve assembly 48. The manually operable switch member 68 is moveable between at least a first position, devised to emit a minimum through flow of water, and a second position, devised to emit a maximum through flow of water to the valve assembly 48. Thus the rate of flow of water through the device 10 is regulable between a minimum and maximum flow.

An alternate and preferred embodiment of the valve assembly 48 is illustrated in FIGS. 6B, 6C, 6D, and 6E. In this preferred embodiment the manual switch member 68 is omitted and outflow of water is controllable between a minimum outflow and a maximum outflow by sequential depressions of the compressible portion 50 to orient a valve gear 64b between each of three rotational aspects wherein waterflow is prevented, waterflow is produced at a minimum rate, and waterflow is produced at a maximum rate. The minimum rate is relatively lesser than the maximum rate but may still be a substantial waterflow.

Figure 6B:
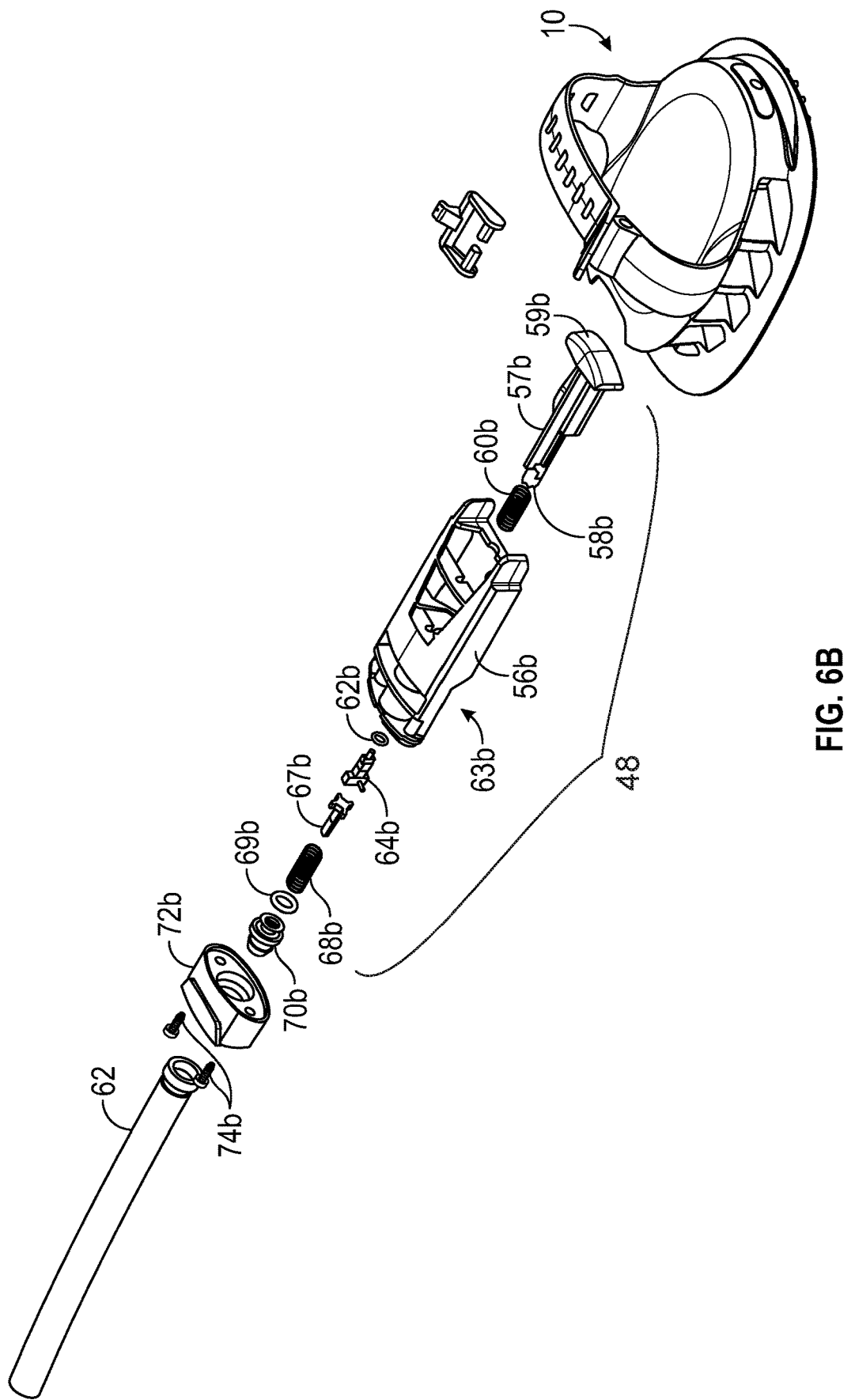
FIG. 6B is an exploded isometric view of an example embodiment detailing a particular valve assembly.

Discussing first FIG. 6B, an exploded isometric view of the alternate valve assembly 48 is illustrated. When a user depresses compressible portion 50 disposed above the distal arced edge 26, head end 59b of striker pin 57b is engaged, displacing striker pin 57b along a longitudinal axis interior to switch housing 56b rearwards, toward the proximal arced edge 28. Tail end 58b of striker pin 57b is thereby caused to compress first spring member 60b and engage endwise with valve gear 64b. Valve gear 64b is thence forced rearwards from a forward position to a rearward position and then in turn compresses stop member 67b and second spring member 68b.

As best shown in FIG. 6E, valve gear 64b has a notched, triangulated surface 65b disposed anteriorly surrounding cylindrical valve gear tip 66b. This triangulated surface 65b is comprised of triangular notches having sloped sides configured to engage with tail end 58b of striker pin 57b to effect a rotational forcing and corresponding rotational motion of valve gear 64b. Such rotational motion of valve gear 64b, however, is prevented when valve gear 64b is disposed in the forwards position, seated into the gear sleeve 61b of switch housing 56b, by action of valve gear's diametric wings 80b which remain engaged interior to lateral channels (not shown) disposed interior to the switch housing 56b gear sleeve 61b when the valve gear 64b is disposed in the forward position. Forcing of the valve gear 64b to the rearward position, however, liberates diametric wings 80b from position interior to the lateral channels, and the valve gear 64b is caused to rotate to a second rotational aspect as defined by the angled ridges comprising the triangulated surface 65b. In the preferred embodiment herein illustrated, this second rotational aspect corresponds to a rotation of 60° relative a first rotational aspect. Release of the compressible portion 50 by the user thence enables rebound of second spring member 68b to force the valve gear 64b back to the forward position wherein diametric wings 80b are engaged by a second pair of channels 78b (best shown in FIG. 6D) to prevent seating of first O-ring 62b, circumferentially disposed upon the valve gear 64b behind the triangulated surface 65b in circumferential seat 81b, to seal off switch housing 56b outlet 63b, whereby a first flow of water is enabled through the outlet 63b and thus through the device 10 corresponding to the minimum flow.

Subsequent depression of compressible portion 50 by a user thence effects like action of the valve gear 64b, forcing it to the rearward position whereby the diametric wings 80b are liberated from second channels 78b enabling the valve gear 64b to rotate again, now to a third rotational aspect. In the preferred embodiment herein depicted, the third rotational aspect corresponds to a rotation of 60° in the same direction relative to the second rotational aspect and the first rotational aspect. Release of the compressible portion 50 thence reseats valve gear 64b to the forward position, and diametric wings 80b are thence engaged in a third pair of channels 79b. In the third rotational aspect, the third pair of channels 79b prevent seating of the first O-ring 62b to seal off the outlet 63b at a greater distance from the forward position relative to the second rotational aspect, whereby a greater flow or water through the outlet 63b is enabled, corresponding to the maximum flow.

Subsequent depression of compressible portion 50 by a user, by like action as already described, the valve gear 64b is restored to the first rotational aspect whereby the valve gear 64b is reseated to the forward position with the first O-ring 62b engaged to seal off the outlet 63b whereby water flow through the device 10 is prevented. The valve gear is thus caused to rotate through six positions corresponding to the three rotational states (that is, two sets of three states because the diametric wings are caused to be disposed in opposite channels). Rotating the valve gear 64b through six positions corresponding to three rotational states may be preferable for controlling throughflow of water, as the valve gear 64b need be caused to rotate a lesser annular distance to effect control of waterflow, which may therefore increase rapidity of control and duration of the parts.

While the above disclosure sets forth 60° increments of rotation, to seat the diametric wings 80b alternately into the first, second, and third pair of channels for the preferred embodiment, and thus via three rotational aspects corresponding to six positions of the diametric wings 80b orienting the valve gear 64b to control water flow through the device 10, it should be understood by persons of ordinary skill in the art that additional rotational aspects are contemplated as within scope of the present invention whereby additional rates of water flow through the device 10 are enabled. Further, rotational aspects are contemplated that produce like through-flows of water—such as 120° increments of rotation whereby the diametric wings 80*b* are seated into a series of channels, not in the alternative—i.e. each diametric wing 80*b* seats into the same channel corresponding to the rotational state of the gear 64*b*. Thus, three rotational aspects, for example, could readily be employed to correspond to three rates of flow-no flow, minimum flow, and maximum flow. Such larger rotational increments may be desirable to effect the abovementioned rates of waterflow.

Figure 7:
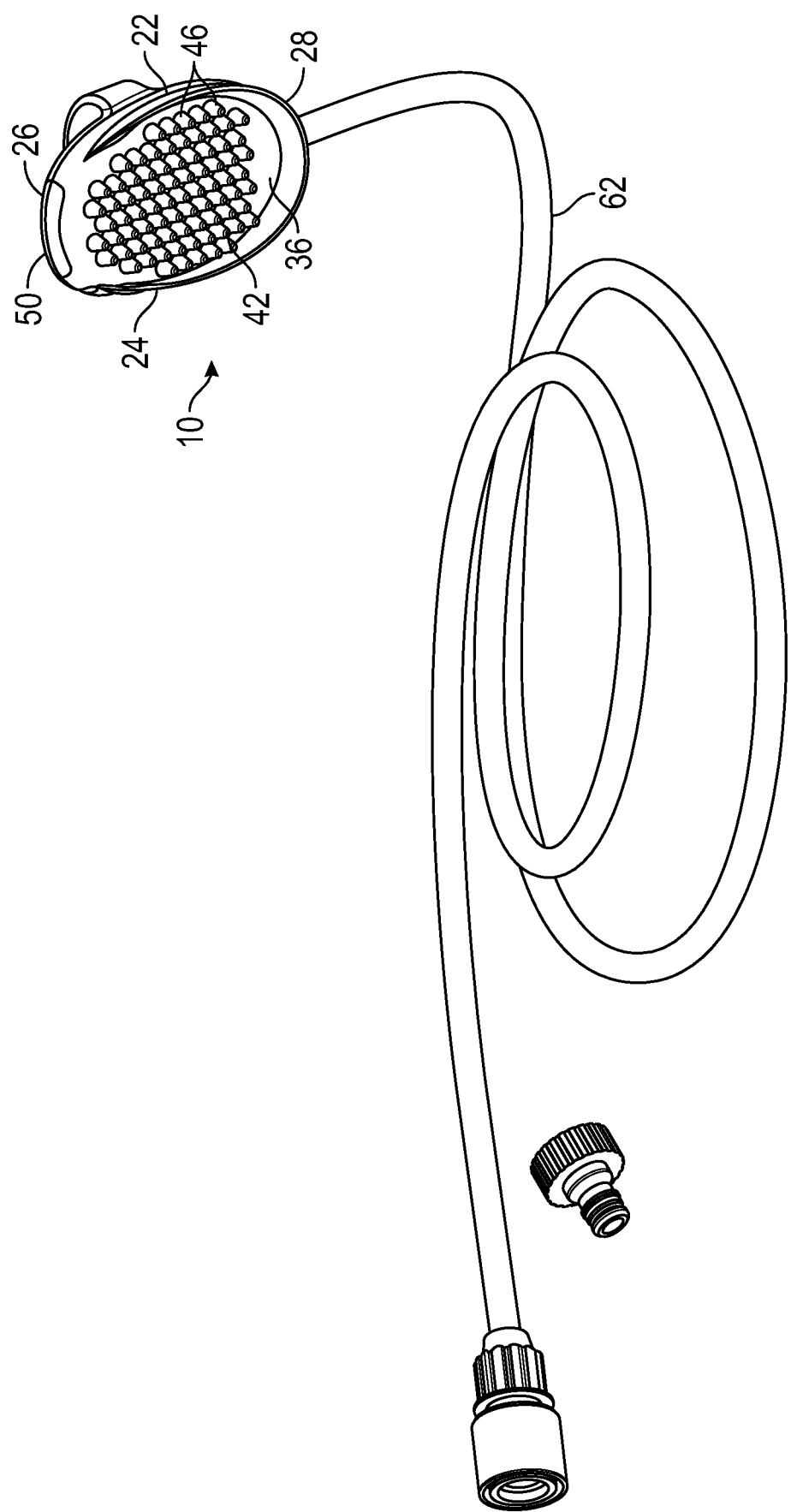
FIG. 7 is an elevation view of an example embodiment.
Figure 8:
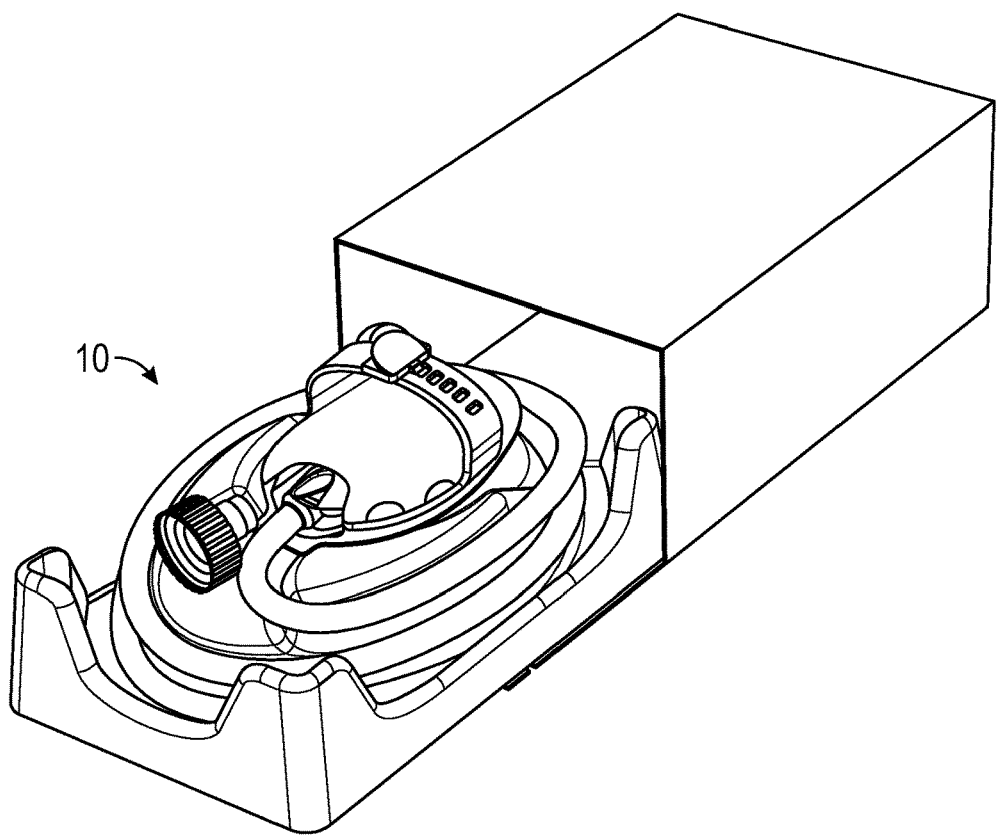
FIG. 8 is an elevation view of an example embodiment packed for shipping.
Figure 9:
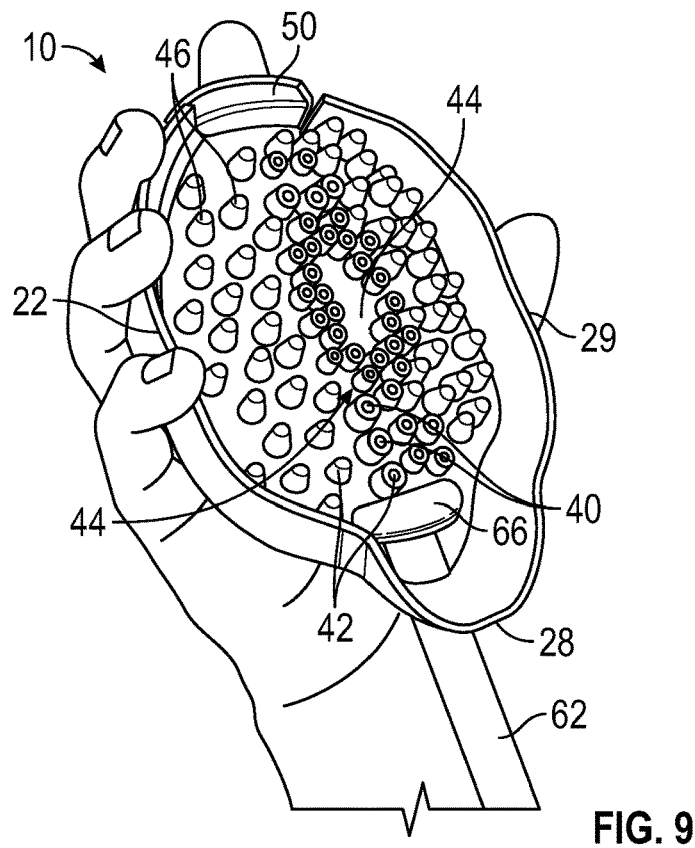
FIGS. 9 through 12 are in-use views of an example embodiment.

As shown in FIG. 7, the compressible portion 50 may occupy a medial position within the distal arced edge 26. In this example embodiment, the proximal arced edge 28 is disposed downwardly from the obverse surface 36 to underlie the proximal inlet 64 and direct water away from a user operating the device 10, particularly when said use elevates the device 10 as when washing a large animal, such as a horse, for example. As shown in FIG. 8, the device 10 is readily storable with the connecting line 62 disposed coiled around the molded body member 20 for compact storage interior to packaging, as case may be.

Figure 10:
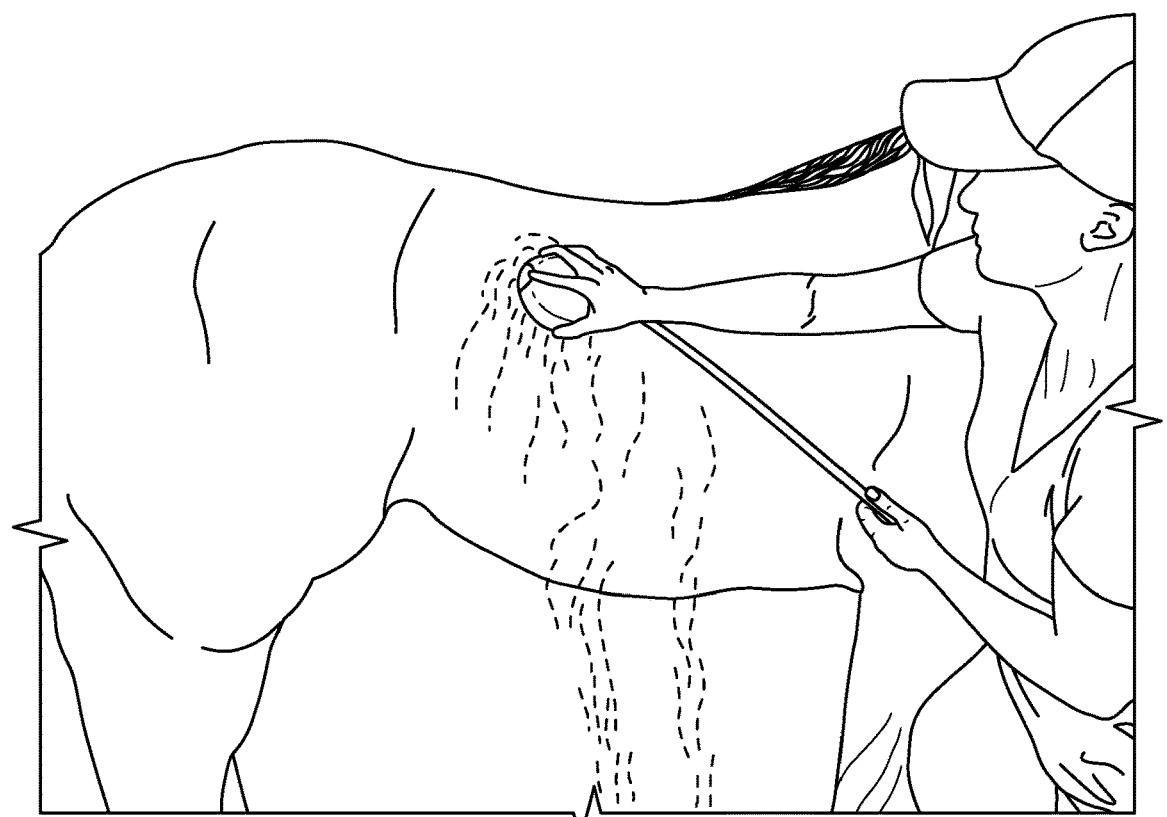
Figure 11:
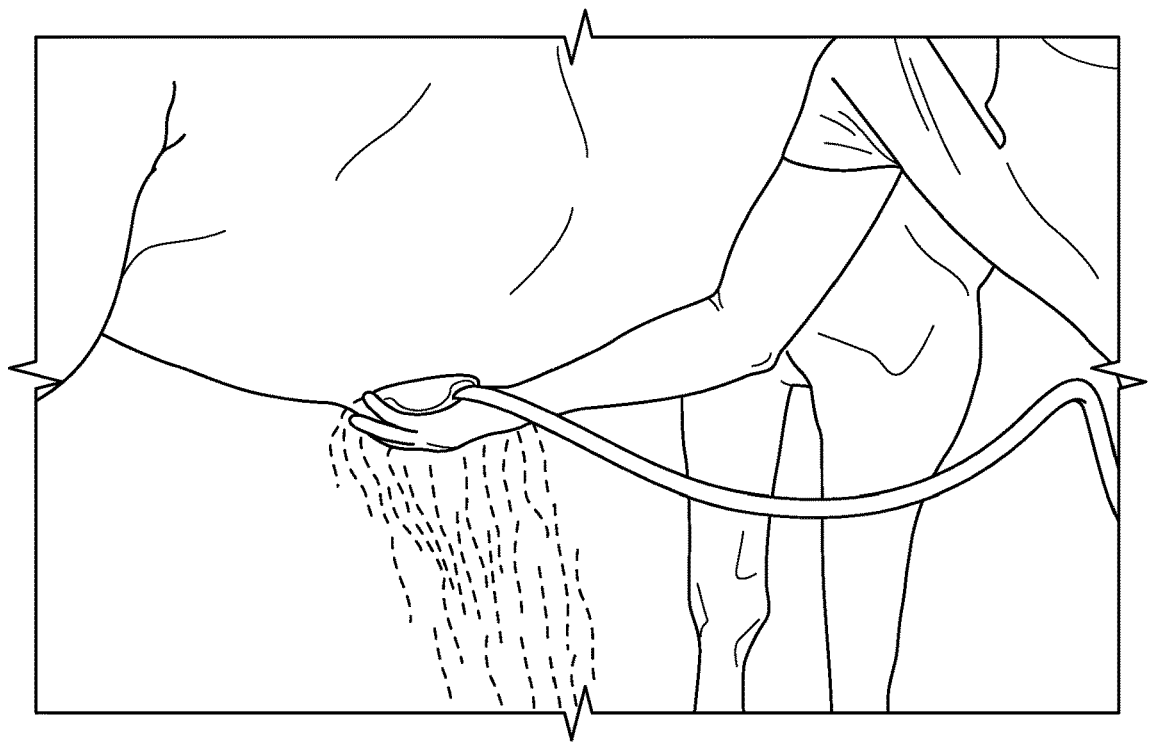
Figure 12:
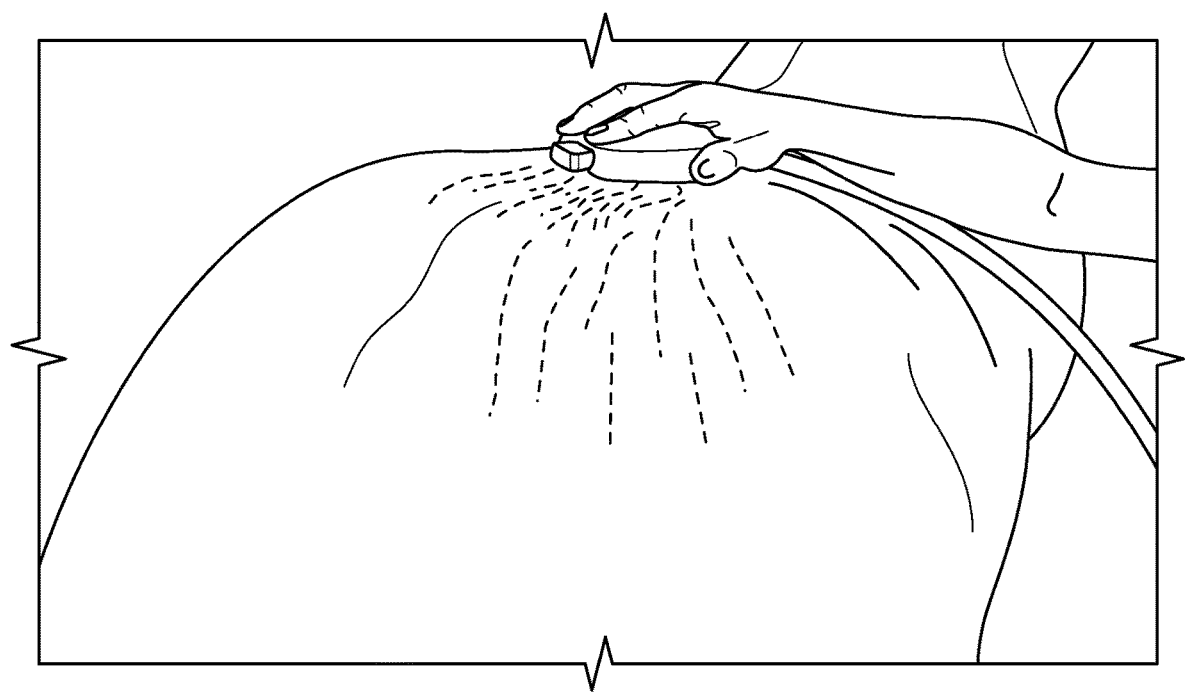

The example embodiment illustrated in FIGS. 9 through 12 shows an alternate embodiment having the compressible portion 50 devised to include the distal arced edge 26 projected downward therefrom in the form of a lip. In this example embodiment, the connecting line 62 is disposed to connect through the proximal arced edge 28 wherein the proximal inlet 64 is disposed congruent with the obverse surface 36 of the molded body member 20. Water is nonetheless directed away from a user during operation of the device 10, as is shown in FIG. 10, by the proximal arced edge 28 extending downwardly away from the obverse surface 36 in a plane underlying the connecting line 62.

What is claimed is:

1. A hand attachable animal washing apparatus attachable to a hand of a user for singlehanded control of water emitted therefrom, said hand attachable animal washing apparatus comprising:
   a molded body member;
   a reverse surface disposed upon the molded body member and configured to overlie a palm of a hand of a user when the body member is attached to the hand of the user;
   an obverse surface;
   a plurality of outlets projected up from the obverse surface, each of the plurality of outlets having an opening thereatop;
   a proximal inlet disposed in open communication with each of the plurality of openings, said proximal inlet connected in open communication with a connecting line for conveyance of water therethrough;
   a valve assembly disposed interiorly within the body member, said valve assembly comprising:
      a compressible portion disposed against the action of a first spring member, said compressible portion compressible between a compressed position and an uncompressed position;
      a switch member in operational communication with the compressible portion, said switch member rotatably and alternately positionable between a first position and a second position when the compressible portion is compressed;
      a second spring member tensioned against the switch member when the switch member is moved from the first position to the second position; and
      a stop member disposed to prevent rebound of the second spring member returning the switch member to the first position until the compressible portion is again compressed and the switch member is rotatably disengaged from the stop member;
   wherein sequential compression of the compressible portion alternately renders the valve assembly in an open configuration and a closed configuration whereby control of water flow though the valve assembly is effective by singlehanded use of a user; and
   an arced proximal edge disposed extended rearwardly from the molded body member underlying the proximal inlet and extending underhanging the connecting line;
   wherein action of the valve assembly is controllable by the same hand of the user upon which the molded body is worn whereby singlehanded application of water when washing an animal is controllable one-handedly and the arced proximal edge diverts water flow away from a user.

2. The hand attachable animal washing apparatus of claim 1 wherein each of the plurality of outlets is conical and projected perpendicularly from the obverse surface.

3. The hand attachable animal washing apparatus of claim 2 further comprising a manually operable switch disposed upon the proximal inlet, said manually operable switch movable between at least a first position corresponding to a minimum water flow and a second position corresponding to a maximum water flow, wherein operation of the manual switch regulates water flow through the molded body member.

4. The hand attachable animal washing apparatus of claim 3 wherein the molded body member is polymeric and flexible, said molded body member further comprising:
   a first side apex;
   a second side apex;
   a strap member endwise disposed at the first side apex; and
   a connecting portion endwise disposed at the second side apex, said connecting portion configured for securable connection with the strap member;
   wherein the strap member and connecting portion enable securement of the molded body member to the hand of the user.

5. The hand attachable animal washing apparatus of claim 4 wherein the molded body member further comprises a connect housing disposed at the proximal inlet whereby the connecting line is securable into the connect housing.

6. A hand attachable animal washing apparatus comprising:
   a molded body member attachable overtop the palm of a user, said molded body member having:
      an obverse surface, a reverse surface, a first side apex, a second side apex, a distal arced edge, and a proximal arced edge, said proximal arced edge extended rearwardly to curve downwardly from the molded body member;
   a strap member endwise disposed at the first side apex;
   a connection portion endwise disposed at the second side apex, said connection portion securable to the strap member;
   a plurality of outlets disposed upon the obverse surface;
   each of a plurality of openings disposed endwise upon each of the plurality of outlets;
   a proximal inlet disposed above the proximal arced edge, said proximal inlet in open communication with each of the plurality of openings;
   a connecting line disposed connected at the proximal inlet, said connecting line distally attachable to an existing water outlet;

a valve assembly disposed interiorly within the molded body member, said valve assembly operable between a first position and a second position to selectively control water flow to each of the plurality of openings; and a manually operable switch disposed upon the proximal inlet port in operational communication with the valve assembly and moveable between at least a first position and a second position to regulate water flow through the molded body member;

wherein action of the valve assembly is controllable by the same hand of the user upon which the molded body is worn whereby singlehanded application of water when washing an animal is controllable one-handedly and the arced proximal edge diverts water flow away from a user.

7. The hand attachable animal washing apparatus of claim 6 wherein the molded body member further comprises a connect housing disposed at the proximal inlet whereat the connecting line is attachable.

8. The hand attachable animal washing apparatus of claim 7 wherein the molded body member is polymeric and flexible.

9. The hand attachable animal washing apparatus of claim 8 wherein the plurality of outlets is disposed upon the obverse surface in a central cluster surrounded by a plurality of protuberances assistive in brushing an animal's coat.

10. A hand attachable animal washing apparatus comprising:
a generally ovoid, polymeric and flexible molded body member attachable overtop the palm of a user, said molded body member having:
an obverse surface, a reverse surface, a first side apex, a second side apex, a distal arced edge, and a proximal arced edge, which proximal arced edge is extended rearwardly to curve downwardly from the molded body member;
a strap member endwise disposed at the first side apex;
a connection portion endwise disposed at the second side apex, said connection portion securable to the strap member;
a plurality of elongate, conical outlets disposed upon the obverse surface in a central cluster;
a plurality of protuberances disposed upon the obverse surface approximal and surrounding the central cluster of the plurality of outlets;
each of a plurality of openings disposed endwise upon each of the plurality of outlets;
a proximal inlet medially disposed above proximal arced edge, said proximal inlet disposed in open communication with each of the plurality of openings;
a connect housing disposed at the proximal inlet;
a connecting line disposed attachable at the connect housing, said connecting line distally attachable to an existing water outlet;
a valve assembly disposed interiorly within the molded body member, said valve assembly disposed between the proximal inlet and each of the plurality of openings, said valve assembly operable between a closed configuration and an open configuration to selectively control water flow through each of the plurality of openings; and
a manually operable switch disposed upon the proximal inlet rearwardly upon the molded body member, said manually operable switch operable between a first position and a second position to regulate waterflow through each of the plurality of openings between a minimum waterflow and a maximum waterfowl;

wherein action of the valve assembly is controllable by the same hand of the user upon which the molded body is worn whereby singlehanded application of water when washing an animal is controllable one-handedly and the arced proximal edge diverts water flow away from a user.

11. A hand attachable animal washing apparatus attachable to a hand of a user for singlehanded control of water emitted therefrom, said hand attachable animal washing apparatus comprising:
a molded body member;
a reverse surface disposed upon the molded body member and configured to overlie a palm of a hand of a user when the body member is attached to the hand of the user;
an obverse surface;
a plurality of outlets disposed upon the obverse surface, each of the plurality of outlets having an opening thereatop;
a proximal inlet disposed in open communication with each of the plurality of openings, said proximal inlet connected in open communication with a connecting line for conveyance of water therethrough;
a valve assembly disposed interiorly within the body member, said valve assembly comprising:
a striker pin disposed interior to a switch housing, said striker pin having a head end and a tail end, said striker pin movable rearwards against the action of a first spring member when the compressible portion is depressed;
a valve gear disposed against the action of a second spring member between a forward position and a rearward position interior to a gear sleeve disposed upon the switch housing, said valve gear having:
a cylindrical tip;
a triangulated surface disposed anteriorly surrounding the cylindrical tip, said triangulated surface presenting sloped surfaces for engagement with the tail end of the striker pin to effect a rotational forcing of the valve gear when moved to the rearward position;
a first O-ring disposed circumferentially upon the valve gear, said first O-ring configured to sealably engage interior to the gear sleeve to seal off an outlet disposed in the switch housing;
a pair of diametric wings configured to seat into each of a series of corresponding pairs of channels disposed longitudinally upon the gear sleeve, wherein the pair of diametric wings is liberated from engagement interior to any of the said pairs of channels when the valve gear is moved to the rearward position and the valve gear is forced to rotate to a corresponding rotational aspect whereby the diametric wings are caused to seat interior to another corresponding pair of channels when the valve gear is returned to the forward position by action of the second spring member; and
an arced proximal edge disposed extended rearwardly from the molded body member underlying the proximal inlet and extending underhanging the connecting line;

wherein action of the valve assembly is controllable by singlehanded depression of the compressible portion to cause rotation of the valve gear between at least three rotational aspects and correspondingly seat position of the first O-ring to prevent waterflow, enable a minimum water flow, and a maximum water flow through the device, whereby singlehanded application of water when washing an animal is controllable one-handedly and the arced proximal edge diverts water flow away from a user.

* * * * *